United States Patent [19]
Toussaint et al.

[11] Patent Number: 4,505,538
[45] Date of Patent: Mar. 19, 1985

[54] ELECTROCHROMIC DISPLAY DEVICES

[75] Inventors: Francois Toussaint, Montigny-le-Tilleul; Jean-Claude Hoyois, Ham-sur-Heure, both of Belgium

[73] Assignee: Glaverbel, Brussels, Belgium

[21] Appl. No.: 416,712

[22] Filed: Sep. 10, 1982

[30] Foreign Application Priority Data

Oct. 19, 1981 [GB] United Kingdom ............... 8131467

[51] Int. Cl.³ ............................................. G02F 1/23
[52] U.S. Cl. ........................................................ 350/357
[58] Field of Search ........................................ 350/357

[56] References Cited
U.S. PATENT DOCUMENTS 4,343,537 8/1982 Güntherodt et al. ............... 350/357
4,435,048 3/1984 Kamimori et al. .................. 350/357

Primary Examiner—John K. Corbin
Assistant Examiner—Lynn Vandenburgh Kent
Attorney, Agent, or Firm—Spencer & Frank

[57] ABSTRACT

An electrochromic device comprising a solid layered structure. The structure includes a pair of electrodes and an electrochromic layer sandwiched between the pair of electrodes. The device is sandwiched between a pair of vitreous sheets of which at least one is transparent with a reservoir of ionizable material being held between the sheets. On application of an electrical potential between the electrodes, ions are permitted to migrate between the ionizable material and the electrochromic layer.

4 Claims, 7 Drawing Figures

ELECTROCHROMIC DISPLAY DEVICES

BACKGROUND OF THE INVENTION

This invention relates to an electrochromic device comprising a solid layered structure in which an electrochromic layer is sandwiched between a pair of electrodes.

Ther term "electrochromism" is employed to denote the known property of a material whereby its electromagnetic radiation absorption characteristic is altered under the influence of an electric field. Such materials, for example, may exhibit little or no absorption of visible wave lengths in a first state and therefore be transparent, but when subjected to an electric field, effectively absorb in the red end of the spectrum, turning blue in colour. Similar effects can be observed in other portions of the electromagnetic radiation spectrum, invisible as well as visible.

The electrochromic material may be persistent, that is to say it may be a material responsive to the application of an electric field of a given polarity to change from a first persistant state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

If a layer of a persistent electrochromic material is disposed between a pair of electrodes across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic layer. Thus, if the sandwich of electrodes and electrochromic material on the substrate originally is clear, i.e. presenting substantially no decrease of the light transmitting ability of the substrate, application of a voltage between the electrodes to establish an electric field of the proper polarity changes the light absorption characteristic of the electrochromic material, turning it darker for example, thus decreasing the light transmitting ability of the entire assembly.

Known electrochromic materials are usually compounds of the transition metals, in particular tungsten and molybdenum oxides. The most commonly used solid electrochromic material is probably tungstic oxide ($WO_3$), and the electrochromic phenomenon can be discussed with reference to that material. The coloration of $WO_3$ results from the simulaneous injection into it of monovalent cations $M^+$ (where M is for example H, Li, Na or Ag) and electrons which partially transform the tungstic oxide into a coloured M-W-O complex.

The application of this principle to display panels has hitherto been made by forming an electrolytic cell having a succession of layers; electrode layer, electrochromic layer, cation furnishing electrolyte layer, electrode layer.

The most efficacious cation for use in such circumstances is the $H^+$ cation (proton) because of its high charge/weight ratio. This is why many of the known embodiments of electrochromic devices use an aqueous acid solution, e.g. of $H_2SO_4$ as cation source. There are problems inherent in sealing such devices to retain the acid, and there are also problems in that the acid attacks the electrochromic layer. In other known arrangements, attempts have been made to replace the liquid electrolyte layer by a solid, for example by forming the acid into a gel or by impregnating a porous material. These arrangements present less of a problem in sealing the panel, but the problem of progressive degradation of the electrochromic layer by acid attack remains.

Another proposal has been to use a structure in which the so called "electrolyte" is itself a solid. Solid electrolytes which have hitherto been used are not necessarily true electrolytes in the usual meaning of that term, that is to say, they are not necessarily substances which dissociate into ions. The cations (usually $H^+$) which migrate from the solid electrolyte to the electrochromic layer may be formed within the solid electrolyte or they may traverse the solid electrolyte from another source towards the electrochromic material. Thus the term "solid electrolyte" as used in this specification includes cationic conductors.

Known electrochromic devices often also contain a depolarising layer located between the solid electrolyte and the electrode in order to permit reversibility. The depolarising layer conducts at the same time cations and electrons. It serves to depolarise the electrode and can also furnish cations for transfer through the solid electrolyte to the electrochromic material. In such devices, the cations (usually $H^+$) are furnished by the electrolyte and/or by the depolarising layer and also by water which is adsorbed in the different layers of the devices. This water comes from the atmosphere in contact with the layers during their formation and throughout their lives. This is why this type of electrochromic device is subject to atmospheric humidity, in some cases to such an extent that under dry conditions, no coloration of the electrochromic material can be effected. Thus, one particular problem which has arisen with electrochromic devices is a differing response time which depends on the atmosphere in which they are present. This is clearly undesirable, and it is an object of the present invention to obviate this disadvantage.

SUMMARY OF THE INVENTION

Accordingly, the present invention in its first aspect comprises an electrochromic device comprising a solid layered structure in which an electrochromic layer is sandwiched between a pair of electrodes, characterised in that the device is sandwiched between a pair of vitreous sheets of which at least one is transparent in such manner that a reservoir of ionisable material is held between said sheets to permit migration of ions between said ionisable material and the electrochromic material on the application of an appropriate potential between said electrodes. Because the reservoir contains a fixed amount of ionisable material, the response time of an electrochromic device according to the invention will be substantially constant, much more nearly so than in the case of previously known devices.

In some preferred embodiments of the device the reservoir is a gas-filled space which is filled for example with humid air, but in other, preferred embodiments said reservoir is constituted by a body of adhesive material containing a controlled degree of humidity and bonding the device together as a laminated panel.

In order to promote response time and reversibility of the state of the electrochromic material it is very much preferred for the device to comprise, between said electrodes, a depolarising layer, a solid electrolyte layer and an electrochromic layer, and for the said depolarising layer to comprise nickel infused with hydrogen or $MoO_3$ or $WO_3$ with minor additions of BaO.

In some highly preferred embodiments of the invention, said device comprises, between said electrodes, a solid electrolyte layer and said electrochromic layer, and said electrolyte layer comprises a aluminium fluoride, a sodium aluminium fluoride or silicon monoxide with a minor addition of manganese oxide or chromium. These materials can serve as higly efficient ion permeable insulators thus making the electrochromic state of the electrochromic layer substantially permanent until a reverse polarity potential is applied to the electrodes.

Furthermore, the materials specified above for the depolarising layer and the solid electrolyte layer have the advantage of being depositable as successive coatings by known vacuum deposition techniques. It is thus very simple to form an electrochromic display device in a single vacuum deposition installation in which successive coatings forming the first electrode, the electrochromic layer, the solid electrolyte layer, the depolarising layer and the second electrode are deposited without removing the substrate from the coating installation.

In other highly preferred embodiments of the invention, the device comprises a depolarising electrolyte layer and said electrochromic layer between said electrodes, said depolarising electrolyte layer comprising a mixture of silicon monoxide and chromium.

Such a depolarising electrolyte layer combines in a single layer the functions of a solid electrolyte layer and a depolarising layer and thus allows a reversible electrochromic display device to be formed with one layer less than is usual.

These last three features of the invention above referred to are of considerable importance, and accordingly this invention extends in its second aspect to any electrochromic device comprising a solid layered structure in which an electrochromic layer is sandwiched between a pair of electrodes, characterised in that such device comprises a first said electrode, a depolarising layer, a solid electrolyte layer, an electrochromic layer and a second said electrode wherein said depolarising layer comprises nickel infused with hydrogen or $MoO_3$ or $WO_3$ with minor additions of BaO.

In preferred embodiments of the second aspect of the invention, said solid electrolyte layer comprises an aluminum fluoride, a sodium aluminium fluoride, or silicon monoxide with a minor addition of manganese oxide or chromium.

In its third aspect, the present invention extends to any electrochromic device comprising a solid layered structure in which an electrochromic layer is sandwiched between a pair of electrodes, characterised in that such device comprises a first said electrode, a solid electrolyte layer, an electrochromic layer and a second said electrode, wherein said solid electrolyte layer comprises an aluminium fluoride, a sodium aluminium fluoride, or silicon monoxide with a minor addition of manganese oxide or chromium.

In its fourth aspect, the present invention extends to any electrochromic device comprising a solid layered structure in which an electrochromic layer is sandwiched between a pair of electrodes, characterised in that such device comprises a first said electrode, a depolarising electrolyte layer, an electrochromic layer and a second said electrode, wherein said depolarising electrolyte layer comprises a mixture of SiO and Cr.

BRIEF DESCRIPTION OF THE DRAWINGS

The invention will now be described in greater detail with reference to the accompanying drawings in which.

DESCRIPTION OF THE PREFERRED EMBODIMENTS

In FIGS. 1 to 5, a transparent glass substrate 1 has successively deposited on it a transparent electrode 2, and insulating mask of which parts are shown at 3 and a layer of electrochromic material 4. The transparent electrode 2 of each electrochromic display device is suitably of doped tin oxide which is preferably formed pyrolytically, for example by spraying tin chloride onto hot glass. This may form a rugose coating which is favourable for injecting electrons into the electrochromic material 4 and thus improves the response time of the device. In a specific practical example, the tin oxide coating ($SnO_2$) is formed to a thickness of 750 mm by pyrolysis of an aqueous solution of $SnCl_2$ containing $NHF_4.HF$.

Figure 1:
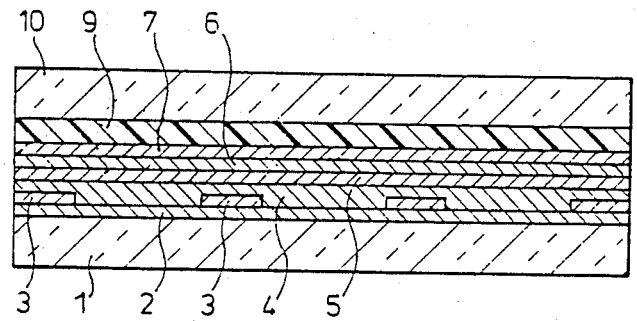
FIGS. 1 to 5 are cross sectional views of a number of embodiments of electrochromic display devices according to the invention.
Figure 3:
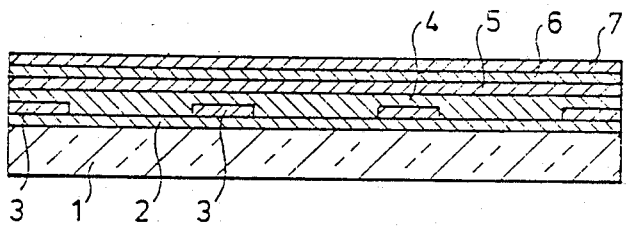
Figure 5:
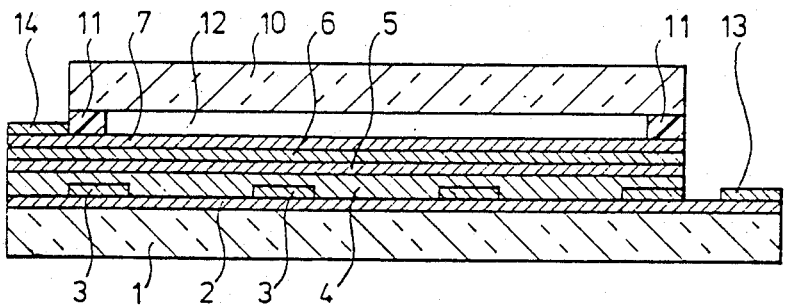

In FIGS. 1, 3 and 5, the electrochromic layer 4 is successively coated with a solid electrolyte layer 5, a depolarising layer 6 and a second electrode 7.

Figure 2:
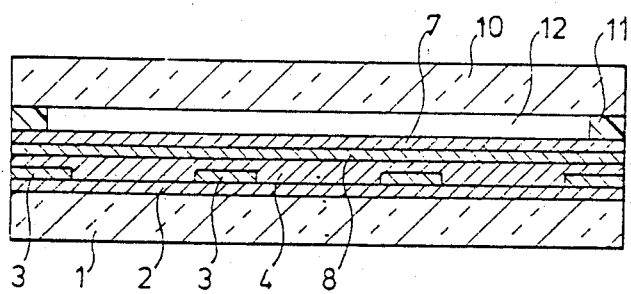
Figure 4:
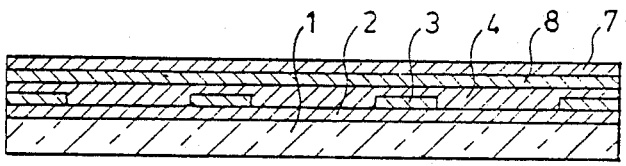

In FIGS. 2 and 4, the electrochromic layer 4 is successively covered by a depolarising electrolyte layer 8 and a second electrode 7.

The display devices shown in FIGS. 1 to 5 are designed to be viewed from below.

EXAMPLE I

In FIG. 1 a second glass sheet 10 is bonded to the first glass sheet 1 via the coatings formed thereon by a layer of adhesive material 9. The adhesive material 9 chosen is a plastics material containing a controlled degree of humidity and it extends across the area of the electrochromic device so that it may serve as a reservoir of ionisable material in accordance with the first aspect of the invention. As an example, the adhesive material 9 is constituted by a layer of polyvinylbutyral, for example 0.38 mm or 0.76 mm in thickness having a residual humidity of 70%. Another example for adhesive material 9 is a silicone resin which polymerises by absorption of water.

The solid electrolyte layer 5 illustrated in FIG. 1 may be made of any of the following known materials: MgF, $Al_2O_3$, hydrated alkali metal salts, hydrated alkaline earth metal salts, $Na_2 Zr_2 Si P_2 O_{12}$, $Na_3 Zr_2Si P O_{12}$, SiO, $Ca F_2$ and sulphonic polystyrene. However and in accordance with the third aspect of the invention, it is preferred to select the solid electrolyte from: aluminium fluoride, $Na_3 AlF_6$, $Na_5 Al_3 F_{14}$, and silicon monoxide with a minor addition of manganese dioxide or chromium. Hydrated porous silicates or alumino-silicates may also be used.

The depolarising layer 6 illustrated in FIG. 1 may be made of any of the materials known for this purpose, for example: polyethylene sulphonic acid; platinum, palladium or rhodium associated with an $H^+$ ion provider; $WO_3$; and $WO_3$ and graphite, but preferably, and according to the second aspect of the invention, it is deposited from nickel infused with hydrogen or from either $MO_3$ or $WO_3$ with minor additions of BaO.

In a specific practical example, the various coating materials and thicknesses were as given in the following table.

| First electrode 2 | doped $SnO_2$ | 750 nm |
|---|---|---|
| Insulating mask 3 | $ZrO_2$ | 50-100 nm |
| Electrochromic material 4 | Amorphous $WO_3$ | 500-600 nm |
| Solid electrolyte 5 | SiO | 30 nm |
| Depolarising layer 6 | $MoO_3$ | 50-100 nm |
| Second electrode 7 | Au | 10 nm |

EXAMPLE II

FIG. 2 shows a modified display device in which, as has been mentioned, the solid electrolyte layer 5 and the depolarising layer 6 of FIG. 1 are replaced by a single depolarising electrolyte layer 8. A further modification is that a second glass sheet 10 is bonded to the first sheet 1 at its margins by a strip of adhesive material 11 to enclose a gas-filled space 12 containing sufficient moisture to act as a source of $H^+$ ions. The depolarising electrolyte layer 8 may be made by flash vacuum evaporating a cerment containing equal parts by weight of SiO and Cr.

EXAMPLE III

FIG. 3 shows an electrochromic display device generally similar in construction to that shown in FIG. 1 but without the second glass sheet 10 and its adhesive layer 9.

In a specific practical example the various coating materials and thicknesses were as given in the following table.

| First electrode 2 | doped $SnO_2$ | 750 nm |
|---|---|---|
| Insulating mask 3 | $SiO_2$ | 50 nm |
| Electrochromic layer 4 | Amorphous $WO_3$ | 500 nm |
| Solid electrolyte 5 | SiO + Cr | 30 nm |
| Depolarising layer 6 | $WO_3$ | 50 nm |
| Second electrode 7 | Au | 12 nm |

The $SnO_2$ layer may be formed as described above by spraying an aqueous solution of $SnCl_2$ containing $NH_4.HF$ onto a hot glass substrate so that the required pyrolytic reaction takes place. The insulating mask 3 may be produced by electronic bombardment and it may be appropriately patterned by a known photogravure technique. The $WO_3$ electrochromic layer 4 may be deposited at a rate below 1 mm per second by a vacuum evaporation technique under a pressure of $10^{-5}$ to $5 \times 10^{-4}$ Torr. The solid electrolyte layer 5 may be deposited in the same way as the electrochromic layer, by a vacuum evaporation technique under pressure of $5 \times 10^{-6}$ to $10^{-5}$ Torr at a rate of about 0.2 nm/sec. The product which is evaporated may be a cermet containing equal parts by weight SiO and Cr as in Example II, but, in the present case, the layer formed on the substrate contains mainly SiO with a minor addition of Cr. The depolarising layer 6 may be deposited in a similar way to the electrochromic layer 4 but ensuring that the depolarising layer is not electrochromic by incorporating an oxidising agent so that the tungsten and oxygen are deposited in stoichiometric proportions.

By way of a variant, the display device may be formed as a double glazing panel or as a laminate.

EXAMPLE IV

In another example of the display device illustrated in FIG. 3, the various coating materials and thicknesses were as follows, the first electrode being as in Example III.

| Insulating mask 3 | $ZrO_2$ | 50 nm |
|---|---|---|
| Electrochromic material 4 | $WO_3$ | 600 nm |
| Solid electrolyte 5 | $Na_3AlF_6$ | 30 nm |
| Depolarising layer 6 | Ni:H | 100 nm |
| Second electrode 7 | Al | 75 nm |

In this Example, the thickness of the second electrode is such that it is substantially opaque so that, unlike the other Examples given herein, it cannot be viewed by transmitted light, but only by reflected light. Also because of its thickness, the second electrode is substantially impervious to $H^+$ ions deriving from the atmosphere so that any such ions which are to migrate into the layers must do so through their edges.

In a variant of this Example, the coating layers on the glass sheet 1 are protected by a second glass sheet bonded on top of them in the manner illustrated in FIG. 2.

EXAMPLE V

FIG. 4 shows a modification of the display device described in Example II containing the SiO:Cr depolarising electrolyte layer referred to.

EXAMPLE VI

FIG. 5 shows yet another embodiment of display device in accordance with this invention. Like the embodiment illustrated in FIG. 2, this embodiment is of a hollow double glazing construction. The coating layers deposited on the first glass sheet 1 may be as described in Example I or Example III. Also shown in FIG. 5 are conductive deposits 13, 14, respectively, on the first and second electrodes for the attachment of electrical leads. These deposits may be of metal, for example copper, or they may be of a conductive enamel, so that the electrical leads may be soldered to them.

Figure 6:
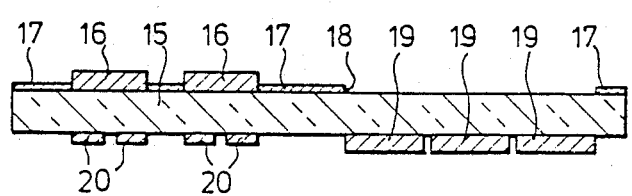
FIGS. 6 and 7 illustrate a keyboard incorporating a number of such display devices.
Figure 7:
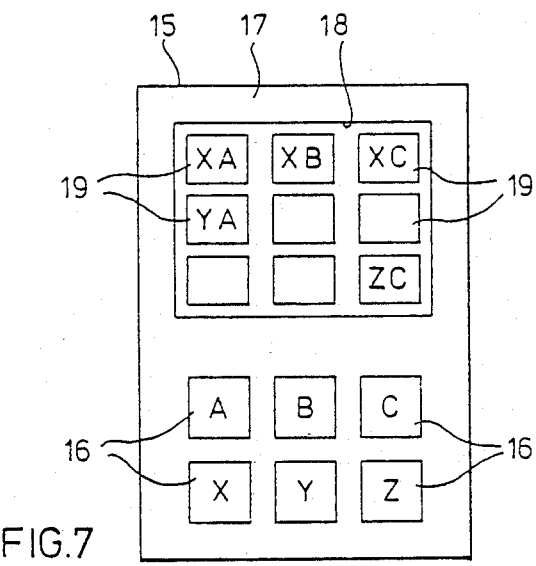

FIGS. 6 and 7 illustrate an electrochromic display device arranged in association with a keyboard. A transparent substrate 15 has on its front face two rows each of three command electrode plates 16 of capacitive touch control switches. The electrodes 16 are formed by transparent coatings of $SnO_2$ so that an optional indication A, B, C, X, Y, Z (FIG. 7) of their function applied to the rear face of the substrate can be seen through them. A decorative mask 17 is applied to the remainder of the front face of the substrate leaving a window 18 through which can be seen three rows each of three electrochromic display devices 19 applied to the rear face of the substrate 15. Also applied to the rear face of the substrate are input and output electrodes 20 of the capacitive touch control switches (which may be of conductive enamel) and connections to an external command circuit (not shown).

The various individual display devices 19 may be as described in any of the foregoing Examples and it will be appreciated that the substrate 15 may constitute the first glass sheet 1 of any of FIGS. 1 to 5. The capacitive touch control switches may for example be constructed in accordance with the teaching of British Patent specification No. 2,060,895 or 2,061,004.

Preferably, according to the first aspect of the invention, the rear face of the substrate is protected by a glass sheet bonded to the substrate by an intervening layer of adhesive such as polyvinyl butyral or by an adhesive tape around their edges.

Such a keyboard display device may, for example, be used as a dashboard display/control device in a motor vehicle.

In one mode of operation, the device may for example be used to control important driving parameters such as the speed of the vehicle, the temperature of the motor, the quantity of fuel . . . thus if the driver desires to know the value of one of these parameters, he may touch the electrode plate 16 X. This can be arranged to cause the top row of display devices 19 to display the name of the parameters XA, XB, XC and to activate the command electrode plate 16A, 16B, 16C. Touching of the appropriate command electrode plate 16A, 16B, 16C, say 16B, then causes display devices 19XA and 19XC to revert to their ground state in which no display is given and causes the display device 19XB to display the name and the value of the parameter XB. Similarly electrode plate 16Y and 16Z can be touched to use display device 19YA, 19YB, 19YC and 19ZA, 19ZB, 19ZC.

In other similar modes of operation, the device may be used to operate equipment in the vehicle, for example lights or heating apparatus.

We claim:

1. An electrochromic device comprising a solid layered structure, said structure including a pair of electrodes and an electrochromic layer sandwiched between said pair of electrodes, in combination with: a pair of vitreous sheets of which at least one is transparent, said device being sandwiched between said pair of vitreous sheets; and a reservoir of ionisable material held between said sheets, said reservoir being a gas-filled space within said device and being a controlled-humidity source of $H^+$ ions, wherein on the application of an electrical potential between said pair of electrodes, ions are permitted to migrate between said ionisable material and said electrochromic layer.

2. An article according to claim 1, wherein said device further comprises a depolarising layer and a solid electrolyte layer both disposed along with said electrochromic layer between said pair of electrodes, said depolarising layer comprising nickel infused with hydrogen or $MoO_3$ and $WO_3$ with minor additions of BaO.

3. An article according to claim 1, wherein said device further comprises a solid electrolyte layer disposed along with said electrochromic layer between said pair of electrodes, said electrolyte layer comprising one of aluminum fluoride, sodium aluminum fluoride, and silicon monoxide with a minor addition of manganese oxide or chromium.

4. An article according to claim 1, wherein said device further comprises a depolarising electrolyte layer disposed along with said electrochromic layer between said pair of electrodes, said depolarising electrolyte layer comprising a mixture of silicon monoxide and chromium.

* * * * *